(12) United States Patent
Choi et al.

(10) Patent No.: US 8,437,550 B2
(45) Date of Patent: May 7, 2013

(54) METHOD, TERMINAL DEVICE, AND COMPUTER-READABLE RECORDING MEDIUM FOR SETTING AN INITIAL VALUE FOR A GRAPH CUT

(75) Inventors: Jong Hyun Choi, Incheon (KR); Tae Hoon Kim, Gyeonggi-do (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/378,455

(22) PCT Filed: Oct. 29, 2010

(86) PCT No.: PCT/KR2010/007515
§ 371 (c)(1),
(2), (4) Date: Dec. 15, 2011

(87) PCT Pub. No.: WO2011/055930
PCT Pub. Date: May 12, 2011

(65) Prior Publication Data
US 2012/0093414 A1 Apr. 19, 2012

(30) Foreign Application Priority Data
Nov. 4, 2009 (KR) .................. 10-2009-0106214

(51) Int. Cl.
*G06K 9/34* (2006.01)
(52) U.S. Cl.
USPC ........................................ 382/173
(58) Field of Classification Search ............ 382/173, 382/176, 115, 118, 282, 28
See application file for complete search history.

(56) References Cited

U.S. PATENT DOCUMENTS

| | | | |
|---|---|---|---|
| 2008/0002890 A1* | 1/2008 | Hu | 382/203 |
| 2009/0226044 A1* | 9/2009 | Ngan et al. | 382/115 |
| 2009/0231458 A1* | 9/2009 | Moriyama | 348/222.1 |
| 2009/0263038 A1* | 10/2009 | Luo et al. | 382/254 |

FOREIGN PATENT DOCUMENTS

| | | |
|---|---|---|
| KR | 10-2007-0023357 A | 2/2007 |
| KR | 10-0698845 B1 | 3/2007 |
| KR | 10-2007-0117393 A | 12/2007 |

OTHER PUBLICATIONS

Huang, et al., Vector Boosting for Rotation Invariant Multi-View Face Detection, ICCV (International Conference on Computer Vision) 2005.
Boykov, et al., Fast Approximate Energy Minimization via Graph Cuts, IEEE Transactions on Pattern Analysis and Machine Intelligence, vol. 23, No. 11, Nov. 2001.
Gagunashvili, N.D., Chi-Square Tests for Comparing Weighted Histograms, Nuclear Instruments and Methods, May 2009.

* cited by examiner

*Primary Examiner* — Yon Couso
(74) *Attorney, Agent, or Firm* — Blakely, Sokoloff, Taylor & Zafman LLP (57) ABSTRACT

The present invention relates to a method for setting initial values of graph cuts) to distinguish between a character region and a background region in an image. The method includes the steps of: (a) detecting a face region from an inputted image; (b) determining reference character region patterns including respective face regions, among pre-stored multiple character region patterns, of which degrees of similarity to the detected face region exceed the predetermined value; and (c) granting an initial value for the background to a first region which is not covered by any of the reference character region patterns and an initial value for the character to a second region which is covered by all of the reference character region patterns if the reference character region patterns are aligned overlappedly on the inputted image based on the detected face region.

21 Claims, 7 Drawing Sheets

METHOD, TERMINAL DEVICE, AND COMPUTER-READABLE RECORDING MEDIUM FOR SETTING AN INITIAL VALUE FOR A GRAPH CUT

CROSS REFERENCE TO RELATED APPLICATIONS

This application is a U.S. National Phase Application of International Application PCT Application No. PCT/KR2010/007515 filed on Oct. 29, 2010, which claims the benefit of priority from Korean Patent Application No. 10-2009-0106214 filed on Nov. 4, 2009. The disclosures of International Application PCT Application No. PCT/KR2010/007515 and Korean Patent Application No. 10-2009-0106214 are incorporated herein by reference.

FIELD OF THE INVENTION

The present invention relates to a method, a terminal and a computer-readable recording medium for setting an initial value for a graph cut; and more particularly, to the method, the terminal and the computer-readable recording medium for acquiring the initial value for the graph cut by using pre-stored multiple character region patterns and thereby performing image editing more accurately and more effectively by using the graph cut.

BACKGROUND OF THE INVENTION

Thanks to the wide spread of digital devices such as a mobile phone with which a person communicates with another person while looking at the opposite person's face, a webcam used for video chatting and a digital camera with which a person's face can be shot, users who want to photograph and edit portrait images in their daily lives are dramatically increasing.

In respect of this, a portrait image editing method which triggers the users' interest by replacing a background region exclusive of a character region on a portrait image with a different interesting background has been introduced. To perform the aforementioned method for editing the portrait image, a technology for distinguishing between the character region and the background region included in the portrait image is essentially required. A graph cut algorithm may be an example of the technology. The graph cut algorithm is a technology for distinguishing different objects in an image based on an initial value(s) granted to a region(s) of the image and it may be usefully used to distinguish between a foreground region (i.e., a character region) and a background in the image.

As a conventional technology for setting the initial value of the graph cut, a technology for setting the initial value by a user's manual input may be considered. However, according to the technology, the user has to directly set a part corresponding to a character region for each portrait image which the user wants to edit. For the reason, this causes inconvenience due to the user's too much input. Furthermore, as another conventional technology for setting the initial value of the graph cut, a technology for using a numerical model such as a Gaussian mixture model (GMM) may be considered. However, according to this, it requires an excessively large amount of calculations so that it may cause slow calculation speed. Therefore, it may be inappropriate to run on a mobile terminal which cannot have a very high performance processor.

Accordingly, what is needed is a technology for effectively setting the initial value of the graph cut to accurately provide a service of editing a portrait image on the mobile terminals.

SUMMARY OF THE INVENTION

It is, therefore, one object of the present invention to solve all the problems mentioned above.

It is another object of the present invention to perform image editing more accurately and more effectively in use of a graph cut by setting an initial face region and an initial background region in an inputted image with use of pre-stored multiple character region patterns and granting the initial values for the initial face region and the initial background region, respectively.

In accordance with one aspect of the present invention, there is provided a method for setting initial values of graph cut(s) to distinguish between a character region and a background region in an image, including the steps of: (a) detecting a face region from an inputted image; (b) determining reference character region patterns including respective face regions, among pre-stored multiple character region patterns, of which degrees of similarity to the detected face region exceed the predetermined value; and (c) granting an initial value for the background to a first region which is not covered by any of the reference character region patterns and an initial value for the character to a second region which is covered by all of the reference character region patterns if the reference character region patterns are aligned overlappedly on the inputted image based on the detected face region.

In accordance with another aspect of the present invention, there is provided a terminal for setting initial values of graph cut(s) to distinguish between a character region and a background region in an image, including: a face region detecting part for detecting a face region from an inputted image; and an initial value setting part for determining reference character region patterns including respective face regions, among pre-stored multiple character region patterns, of which a degrees of similarity to the detected face region exceed the predetermined value, and granting an initial value for the background to a first region which is not covered by any of the reference character region patterns and an initial value for the character to a second region which is covered by all of the reference character region patterns if the reference character region patterns are aligned overlappedly on the inputted image based on the detected face region.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a certain feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are as follows:

Configuration of Terminal

Below is a detailed explanation on an internal configuration and components of a terminal 100 which perform their important functions for the implementation of the present invention.

In accordance with an example embodiment of the present invention, digital devices which have memory means and a micro processor with a calculation ability, such as a personal computer (e.g., desktop, laptop, etc.), a workstation, a PDA, a web pad, a cellular phone, etc., may be adopted as the terminal 100 in accordance with the present invention.

Figure 1:
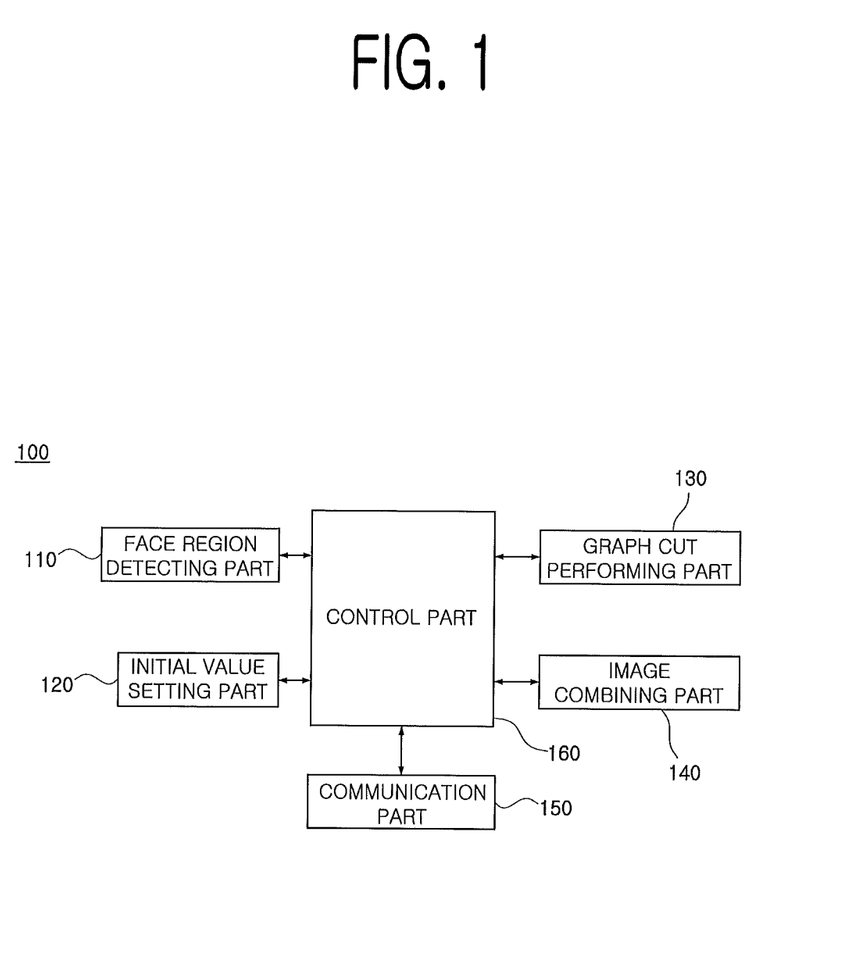
FIG. 1 is a drawing exemplarily illustrating an internal configuration of a terminal 100 in accordance with an example embodiment of the present invention.

FIG. 1 exemplarily illustrates the internal configuration of the terminal 100 in accordance with an example embodiment of the present invention.

By referring to FIG. 1, the terminal 100 in accordance with an example embodiment of the present invention may include a face region detecting part 110, an initial value setting part 120, a graph cut performing part 130, an image combining part 140, a communication part 150 and a control part 160. In accordance with an example embodiment of the present invention, at least some of the face region detecting part 110, the initial value setting part 120, the graph cut performing part 130, the image combining part 140, the communication part 150 and the control part 160 may be program modules communicating with an external system (not illustrated). The program modules may be included in the terminal 100 in a form of an operating system, an application program module and other program modules and may also be stored on several memory devices physically. Furthermore, the program modules may be stored on remote memory devices communicable to the terminal 100. The program modules may include but not be subject to a routine, a subroutine, a program, an object, a component, and a data structure for executing a specific operation or a type of specific abstract data that will be described in accordance with the present invention.

First, the face region detecting part 110 in accordance with an example embodiment of the present invention may perform a function of detecting a face region of a person included in an inputted image by using a face detection technology. The face region detected by the face region detecting part 110 may be used during a process of the initial value setting part 120 setting the initial values of the graph cut which will be explained later.

As mentioned above, in order to allow the face region detecting part 110 to detect the face region of the person in the inputted image, a face detection technology must be adopted. As the face detection technology, an article titled "Vector Boosting for Rotation Invariant Multi-View Face Detection" authored jointly by Chang HUANG and three others and published in "ICCV (International Conference on Computer Vision)" in 2005 may be referred to (The whole content of the article may be considered to have been combined herein). The article describes how to detect a face region accurately by a vector boosting algorithm capable of distinguishing angles of various objects included in an image even though the face included in the image is leaned at a specific angle. Of course, the face detection technology applicable to the present invention is not limited only to the method described in the aforementioned article and it will be able to reproduce the present invention by applying various examples.

Next, the initial value setting part 120 in accordance with an example embodiment of the present invention may perform a function of setting at least parts of the inputted image respectively as an initial character region and an initial background region and granting respective initial values to the respective regions, i.e., the initial character region and the initial background region, in order to perform the graph cut algorithm capable of distinguishing between the character region and the background region on the inputted image.

More specifically, the initial value setting part 120 in accordance with an example embodiment of the present invention may perform a function of comparing the face region detected from the inputted image with those included in multiple pre-stored character region patterns and then determining, as a reference character region pattern(s), at least one character region pattern, which includes a face region with a degree of similarity to the detected face region exceeding the predetermined value, among the multiple pre-stored character region patterns.

Below is a detailed explanation mainly focusing on an example embodiment of determining at least two character region patterns as reference character region patterns but it must be understood that the example embodiment of the present invention is not limited only to this and the present invention does not exclude an example embodiment which determines only one character pattern region as a reference character pattern region.

Herein, the pre-stored character region patterns include information on patterns of character regions included in various images acquirable if portraits are shot by using the terminal 100 such as a camera, a mobile phone, etc. and may be stored in advance in certain memory means (not illustrated) or databases (not illustrated). Respective character region patterns in accordance with an example embodiment of the present invention may be stored in connection with information on respective face regions, e.g., the face regions' locations, sizes, etc., included therein and the information on the respective face regions may be used to calculate the degrees of similarity between the detected face region in the inputted image and the respective face regions included in the multiple character region patterns.

Figure 2:
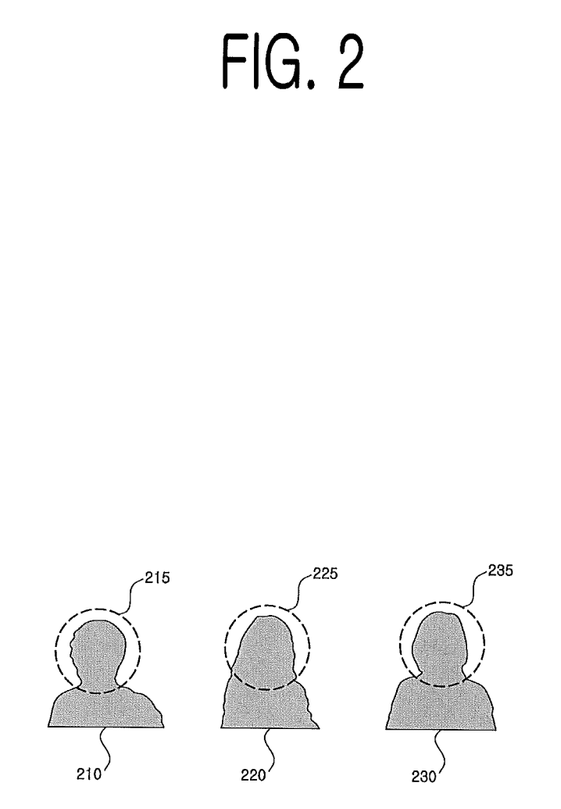
FIG. 2 is a diagram exemplarily showing character region patterns in accordance with an example embodiment of the present invention.

FIG. 2 exemplarily illustrates the character region patterns in accordance with an example embodiment of the present invention. By referring to FIG. 2, character region patterns 210, 220 and 230 may be extracted from portrait images shot in various situations and be stored singly or together with the information on face regions 215, 225 and 235 included in the respective character region patterns as described above.

In accordance with an example embodiment of the present invention, the degrees of similarity between the face region detected from the inputted image and those included in the multiple character region patterns may be determined based on the sizes or percentages of the overlapped area therebetween. In other words, in accordance with the present invention, at least two character region patterns, which include what are similar to the face region on the inputted image, may be selected as reference character region patterns which serve as a criterion of setting initial values of a graph cut algorithm to be explained below. By using the selected reference character region patterns, the character region in the inputted image may be distinguished more accurately.

While the at least two reference character region patterns are arranged on the inputted image to overlap the face region of the inputted image and those of the reference character region patterns (that is, while the reference character region patterns are aligned overlappedly on the inputted image based on the detected face region), the initial value setting part 120 in accordance with an example embodiment of the present invention may set, as an initial background region, a region in the inputted image which is not covered by either of the at least two reference character region patterns, and set, as an initial character region, a region in the inputted image which is covered by all of the at least two reference character region patterns. In short, on assumption that respective regions in the inputted image covered by respective n reference character region patterns are set as $A_1, A_2, \ldots, A_n$, the initial background region may be set as a region corresponding to $(A_1 \cup A_2 \cup \ldots A_n)^c$ and the initial character region as a region corresponding to $(A_1 \cap A_2 \cap \ldots \cap A_n)$.

In addition, the initial value setting part 120 in accordance with an example embodiment of the present invention may grant an initial value for the background and that for the character respectively to the initial background region and the initial character region, where the initial value for the background represents a probability of the initial background region being the real background region and the initial value for the character shows a probability of the initial character region being the real character region.

As shown above, in accordance with the present invention, a region with a high probability of being corresponding to the character region and that with a high probability of being corresponding to the background region may be statistically distinguished by using the reference character region patterns and the statistically distinguished regions will be able to be used as initial values for the graph cut to be explained below.

Figure 3:
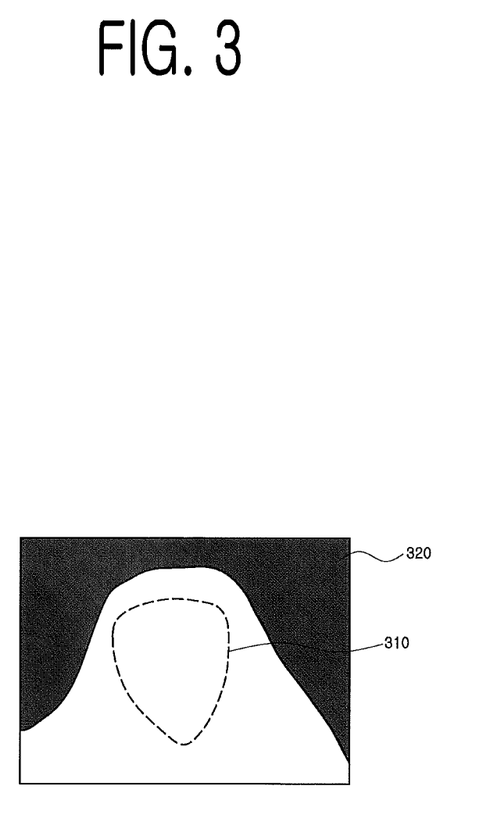
FIGS. 3 and 4 are diagrams exemplarily illustrating configurations for setting an initial background region and an initial character region in accordance with an example embodiment of the present invention.
Figure 4:
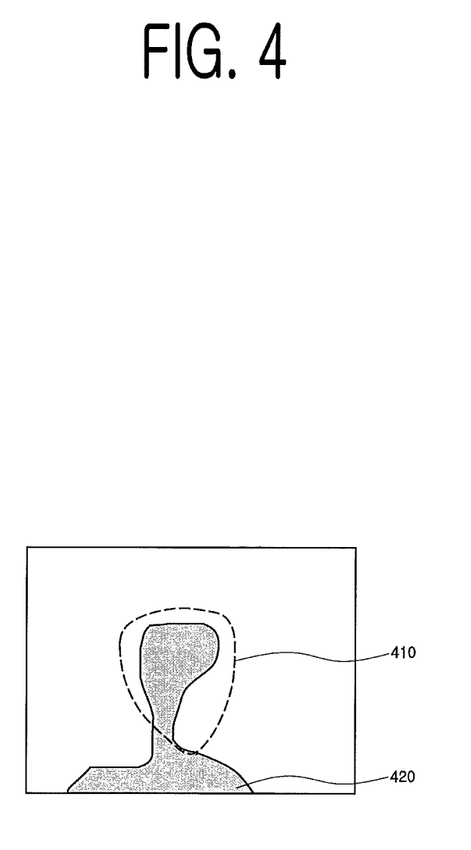

FIGS. 3 and 4 are diagrams exemplarily showing configurations of setting the initial background region and the initial character region in accordance with an example embodiment of the present invention.

By referring to FIG. 3, the initial background region may be set as a region 320 uncovered by any of the at least two reference region patterns arranged on the inputted image assuming that a region 310 is a face region.

By referring to FIG. 4, the initial character region may be set as a region 420 covered by all of the at least two reference region patterns arranged thereon assuming that a region 410 is a face region.

In addition to above-described method for setting the initial character region and the initial background region by using the reference character region patterns, the initial value setting part 120 in accordance with an example embodiment of the present invention may additionally set, as the initial character region, a region corresponding to the inside of an ellipse circumscribed about the detected face region on the inputted image and grant the initial value for the character to the initial character region corresponding to the inside of the ellipse in order to set the initial value of the graph cut for the face region more accurately. At the time, the length of the major axis and that of the minor axis may be adaptively set according to a size and a shape of the detected face region.

In other words, in accordance with the present invention, the graph cut for the face region may be performed more accurately because the additional set of the region of the inside of the ellipse circumscribed about the face region detected in the inputted image as the initial character region for the graph cut may make up for the original initial character region which was set only based on the reference character region patterns.

Figure 5:
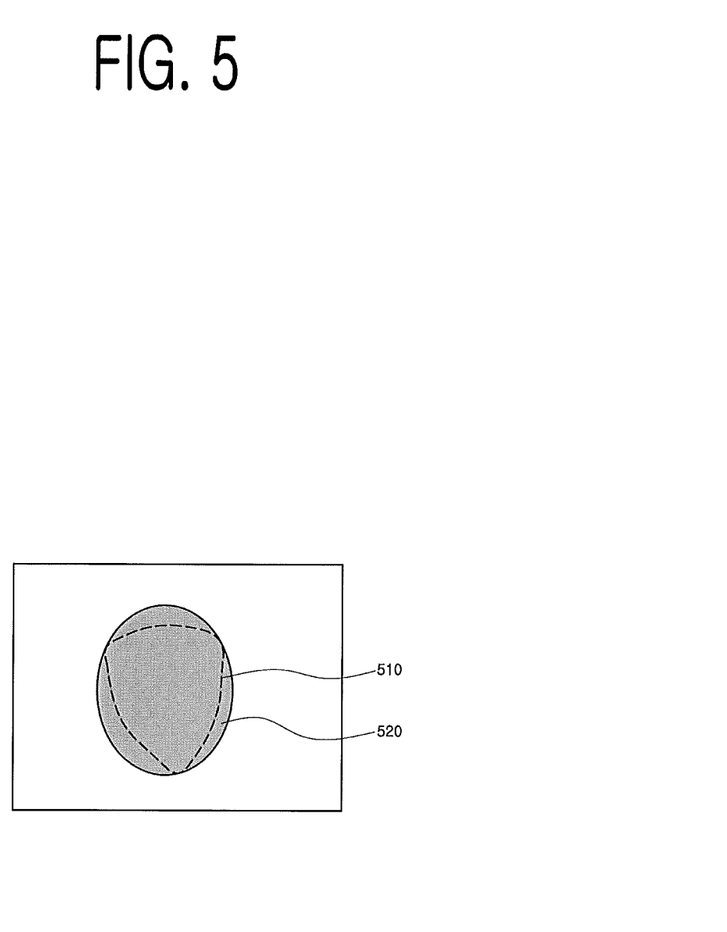
FIG. 5 is a drawing exemplarily representing a configuration for making up for the initial character region based on an ellipse circumscribed about a face region in accordance with an example embodiment of the present invention.

FIG. 5 exemplarily illustrates a configuration of complementing the initial character region based on the ellipse circumscribed about the face region in accordance with an example embodiment of the present invention. By referring to FIG. 5, the initial character region may be complemented by additionally setting the internal region 520 of the ellipse circumscribed about the face region 510 extracted from the inputted image as the initial character region.

Figure 6:
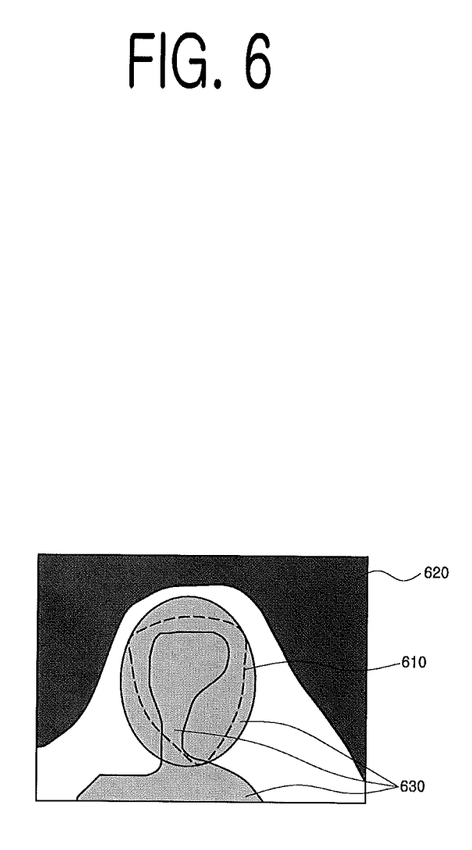
FIG. 6 is a drawing exemplarily showing a configuration for setting initial values of the graph cut in accordance with an example embodiment of the present invention.

FIG. 6 is a diagram exemplarily showing a configuration of setting the initial value of the graph cut in accordance with an example embodiment of the present invention. By referring to FIG. 6, an initial value for the background may be granted to an initial background region 620 and an initial value for the character may be granted to an initial character region 630.

Next, the graph cut performing part 130 in accordance with an example embodiment of the present invention may perform a function of distinguishing between the character region and the background region on the inputted image by conducting the graph cut based on the initial values set by the initial value setting part 120.

As mentioned above, to allow the graph cut performing part 130 to distinguish between the character region and the background region on the inputted image based on certain initial values, a graph cut technology must be used. As the graph cut technology, an article titled "Fast Approximate Energy Minimization via Graph Cuts" jointly authored by Yuri Boykov and two others and published in "IEEE TRANSACTIONS ON PATTERN ANALYSIS AND MACHINE INTELLIGENCE, VOL. 23, NO. 11" in November 2001 may be referred to (The whole content of the article may be considered to have been combined herein). The article mentions how to detect inconsistency included in an image by using an approximate energy minimization algorithm to cut the graph cut. Of course, the graph cut technology applicable to the present invention is not limited only to the method mentioned on the aforementioned article and it will be able to reproduce the present invention by applying various examples.

As well, the graph cut performing part 130 in accordance with an example embodiment of the present invention may perform a function of enhancing a degree of reliability of distinguishing between the character region and the background region in use of the graph cut by comparing color histogram of the character region with that of the background region derived as a result of performing the graph cut, i.e., by determining whether the character region and the background region is successfully distinguished by the graph cut. More particularly, only if a degree of dissimilarity (e.g., chi-square distance) in color histogram distributions between the character region and the background region exceeds the predetermined threshold value, the graph cut performing part 130 in accordance with an example embodiment of the present invention may recognize that the result acquired by performing the graph cut is valid.

As described above, in order to calculate a degree of dissimilarity in the color histogram distributions between the character region and the background region, the graph cut performing part 130 must use a technology for analyzing color histograms. As the technology, an article titled "chi-Square Tests for Comparing Weighted Histograms" authored by N. D. Gagunashvili and published in May 2009 may be referred to (The whole content of the article may be considered to have been combined herein). The article mentions how to determine a degree of dissimilarity between histograms by using chi-square tests. Of course, the technology for analyzing the color histograms applicable to the present invention is not limited only to the method mentioned in the aforementioned article and it will be able to reproduce the present invention by applying various examples.

Furthermore, the graph cut performing part 130 in accordance with an example embodiment of the present invention may perform the graph cuts repeatedly in various conditions and determine as a final character region (or a final background region) a specific character region (or a specific background region) with the highest degree of reliability among various character regions (or among various background regions) derived by repeatedly performed graph cuts. More specifically, the graph cut performing part 130 in accordance with an example embodiment of the present invention, may derive n character regions (or n background regions) by using different combinations of reference character region patterns every time when the graph cuts are repeated for n times and may determine, as the final character region (or the final background region), the specific character region (or the specific background region) with the highest degree of reliability among the n different character regions (or the n different background regions).

As explained above, the combinations of the reference character region patterns are the main criteria for deciding the initial character region and the initial background region for the graph cut(s). The respective combinations selected among the reference character region patterns in respective times may be decided in various methods by appropriately changing the predetermined value of the degree of similarity to the face region as mentioned above. For example, on assumption that the graph cuts are performed repeatedly for three times, character region patterns A and B, character region patterns A, B and C, and character region patterns A, B, C and D, respectively, may be decided as the reference character region patterns for performing a first to a third graph cuts. Accordingly, the respective initial character regions (or the respective initial background regions) for the first to the third graph cuts may be differently determined and respective character regions (or respective background regions) derived as a result of performing the first to the third graph cuts may be differently determined.

For example, the degree of reliability of the character region may be calculated based on the chi-square distance between the character region and the background region in color histograms derived by the graph cut (s). As the chi-square distance is bigger, the degree of reliability of the character region may be judged to be higher.

Next, the image combining part 140 in accordance with an example embodiment of the present invention may perform a function of combining the derived character region as the result of performing the graph cut(s) with a different background image(s). More specifically, the image combining part 140 in accordance with an example embodiment of the present invention may adopt an image processing technology such as alpha blending for a more natural image combination(s).

Figure 7:
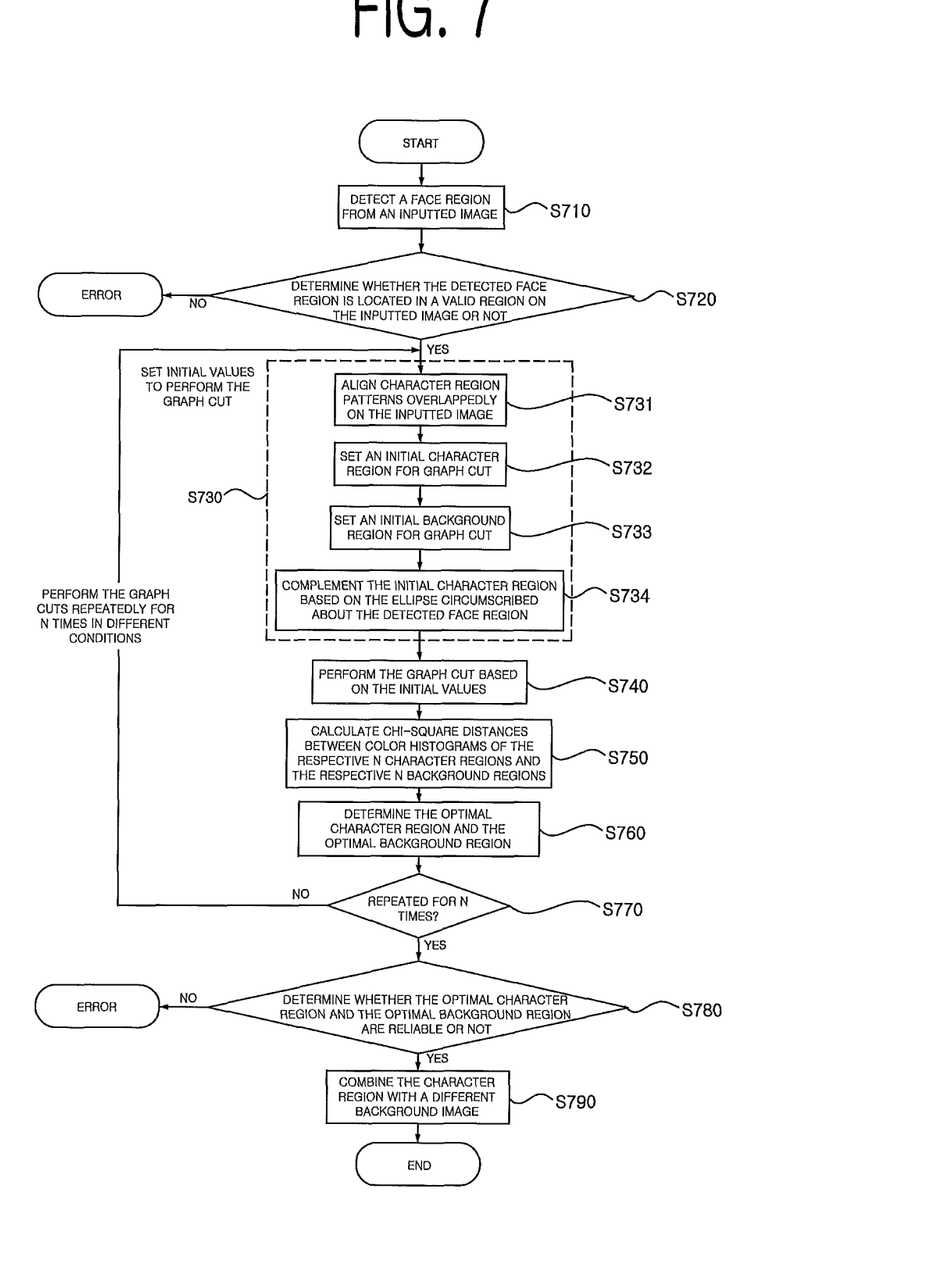
FIG. 7 is a flowchart representing a configuration for distinguishing between the character region and the background region by performing the graph cut and combining the character region with another background image in accordance with an example embodiment of the present invention.

FIG. 7 is a flowchart representing a configuration for distinguishing between the face region and the background region by performing the graph cut (s) and combining the distinguished face region with a different background image(s) in accordance with an example embodiment of the present invention. For reference, FIG. 7 is an exemplary diagram showing one of various example embodiments in the present invention and the configuration of the present invention is not limited to what is illustrated in FIG. 7.

By referring to FIG. 7, the terminal 100 in accordance with an example embodiment of the present invention may detect a face region from an inputted image at the step of S710 and determine whether the detected face region is located in a valid region on the inputted image or not at the step of S720. If the face region detected from the inputted image is located on a region near an edge of the inputted image, etc., the accuracy of the graph cut(s) may not be guaranteed. Therefore, in the case, the graph cut(s) may not be performed.

By referring to FIG. 7, the terminal 100 in accordance with an example embodiment of the present invention may set initial values to perform the graph cut at the step of S730. More specifically, the terminal 100 may align at least two character region patterns stored in the database overlappedly on the inputted image at the step of S731 and may set an initial character region and an initial background region based on the at least two character region patterns aligned on the inputted image at the steps of S732 and S733. Furthermore, the initial character region may be complemented based on the ellipse circumscribed about the face region detected from the inputted image at the step of S734. Since the method for setting the initial values for the graph cut (s) was explained in detail when the functions of the initial value setting part 120 were described, the more detailed explanation on the method is omitted.

By referring to FIG. 7, the terminal 100 in accordance with an example embodiment of the present invention may perform the graph cut based on the initial values set on the previous step and accordingly the character region and the background region may be acquired from the inputted image S740. In addition, by referring to FIG. 7, the terminal 100 in accordance with an example embodiment of the present invention may repeatedly perform the graph cuts for n times in different conditions. In particular, it may calculate chi-square distances between color histograms of the respective n character regions and the respective n background regions derived from the graph cuts repeatedly performed for n times at the step of S750 and determine, as the optimal character region and the optimal background region, a pair of specific character region and specific background region whose the chi-square distance is biggest among the n pairs of character regions and background regions derived by the graph cuts repeatedly performed for n times at the steps of S760 and S770. For reference, as the chi-square distance between the color histogram in the character region and that in the background region is bigger, it means that the color distributions between the character region and the background region are more different.

By referring to FIG. 7, the terminal 100 in accordance with an example embodiment of the present invention may also determine whether the optimal character region and the optimal background region are reliable or not by comparing the predetermined chi-square distance calculated for the optimal character region and the optimal background region with the predetermined threshold at the step of S780.

Lastly, by referring to FIG. 7, the terminal 100 in accordance with an example embodiment of the present invention may combine the character region of the inputted image with a different interesting background image based on the optimal character region and the optimal background region which are considered reliable at the step of S790.

In accordance with an example embodiment of the present invention, the database(s) (not illustrated) may store respective multiple character region patterns in connection with information on face regions included therein (the face regions' locations, sizes, etc.). The database(s) (not illustrated) in the present invention is a concept of a database (s) not only in a narrow meaning but also in a broad meaning which includes data records, etc. based on computer file systems. From the aspect, it must be understood that, even a set of simple operation processing logs may be the database (s) in the present invention if data can be extracted from the set. In addition, the database(s) (not illustrated) in the present invention may be possibly configured inclusively with, or separately from, the terminal 100 at the necessity of those skilled in the art who implement the present invention.

The communication part 150 in accordance with an example embodiment of the present invention may perform a function of instructing the terminal 100 to communicate with an external device such as a telecommunications server (not illustrated) or a web server (not illustrated).

Finally, the control part 160 in accordance with an example embodiment of the present invention may perform a function of controlling data flow among the face region detecting part 110, the initial value setting part 120, the graph cut performing part 130, the image combining part 140 and the communication part 150. Briefly, the control part 160 may control the flow of data from outside or among the components of the terminal 100 and thereby allow the face region detecting part 110, the initial value setting part 120, the graph cut performing part 130, the image combining part 140 and the communication part 150 to perform their unique functions.

In accordance with the present invention, image editing may be performed more accurately and more effectively by setting the initial face region and the initial background region on the input image in use of the pre-stored multiple character region patterns and granting the respective initial values to the respective regions for the graph cut algorithm. Accordingly, the effect of providing the service of editing portrait image on the mobile device in real time may be accomplished.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for setting initial values of graph cut(s) to distinguish between a character region and a background region in an image, comprising:
    a processor detecting a face region from an inputted image;
    determining reference character region patterns including respective face regions among pre-stored multiple character region patterns, of which degrees of similarity to the detected face region exceed the predetermined value; and
    granting an initial value for the background to a first region which is not covered by any of the reference character region patterns and an initial value for the character to a second region which is covered by all of the reference character region patterns if the reference character region patterns are aligned and overlap on the inputted image based on the detected face region.

2. The method of claim 1, wherein the pre-stored multiple character region patterns are stored in connection with information on respective face regions included therein.

3. The method of claim 1, wherein the degrees of similarity are calculated by referring to respective common areas shared by the detected face region from the inputted image and the respective face regions included in the pre-stored multiple character region patterns.

4. The method of claim 1, wherein the initial value for the background represents a probability of a region corresponding to a background region and the initial value for the character shows a probability of a region corresponding to a character region.

5. The method of claim 1, wherein the initial value for the character is granted even to a region corresponding to the inside of an ellipse circumscribed about the detected face region in addition to the second region.

6. The method of claim 1, further comprising distinguishing between a character region and a background region on the inputted image by-performing the graph cut based on at least one of the initial values for the character and that for the background.

7. The method of claim 6, wherein if a chi-square distance in color histograms between the distinguished character region and the distinguished background region is bigger than a threshold, the distinguished character region and the distinguished background region, respectively, are determined as a final character region and a final background region.

8. The method of claim 6, wherein the process is repeatedly performed for n number of times, on condition that respective pairs of the first region and the second region are set differently for n number of times by setting all the predetermined values differently, and a specific character region and a specific background region, selected among n pairs of the character regions and the background regions resulting from the performance of n repetitions, whose chi-square distance in the color histograms is the biggest, are set as a final character region and a final background region.

9. The method of claim 6, further comprising creating an output image by combining a part corresponding to the distinguished character region on the inputted image with a different background region.

10. The method of claim 9, wherein the output image is blended by using alpha-blending technology.

11. A terminal having a processor for setting initial values of graph cut(s) to distinguish between a character region and a background region in an image, comprising:
the processor to execute:
a face region detecting part for detecting a face region from an inputted image; and
an initial value setting part for determining reference character region patterns including respective face regions among pre-stored multiple character region patterns of which degrees of similarity to the detected face region exceed the predetermined value, and granting an initial value for the background to a first region which is not covered by any of the reference character region patterns and an initial value for the character to a second region which is covered by all of the reference character region patterns if the reference character region patterns are aligned and overlap on the inputted image based on the detected face region.

12. The terminal of claim 11, further comprising a database for storing the pre-stored multiple character region patterns in connection with information on respective face regions included therein.

13. The terminal of claim 11, wherein the degrees of similarity are calculated by referring to respective common areas shared by the detected face region from the inputted image and the respective face regions included in the pre-stored multiple character region patterns.

14. The terminal of claim 11, wherein the initial value for the background represents a probability of a region corresponding to a background region and the initial value for the character shows a probability of a region corresponding to a character region.

15. The terminal of claim 11, wherein the initial value setting part grants the initial value for the character even to a region corresponding to the inside of an ellipse circumscribed about the detected face region in addition to the second region.

16. The terminal of claim 11, further comprising a graph cut performing part for distinguishing between a character region and a background region on the inputted image by performing the graph cut based on at least one of the initial values for the character and that for the background.

17. The terminal of claim 16, wherein, if a chi-square distance in color histograms between the distinguished character region and the distinguished background region is bigger than a threshold, the graph cut performing part determines the distinguished character region and the distinguished background region, respectively, as a final character region and a final background region.

18. The terminal of claim 16, wherein setting of the initial values and performance of the graph cuts are repeated for n number of times, on condition that respective pairs of the first region and the second region are set differently for n number of times by setting all the predetermined values made by the initial value setting part differently, and a specific character region and a specific background region, selected among n pairs of the character regions and the background regions resulting from the performance of n repetitions, whose chi-square distance in the color histograms is the biggest, are set as a final character region and a final background region.

19. The terminal of claim 16, further comprising an image combining part for creating an output image by combining a part corresponding to the distinguished character region on the inputted image with a different background region.

20. The terminal of claim 19, wherein the image combining part blends the output image by using alpha-blending technology.

21. A non-transitory medium recording a computer readable program to execute the method of claim 1.

* * * * *